US011865554B2

(12) United States Patent
Muscat (10) Patent No.: US 11,865,554 B2
(45) Date of Patent: Jan. 9, 2024

(54) METHOD AND SYSTEM FOR COLOURING TURF

(71) Applicant: Green Life Farms PTY LTD, Freemans Reach (AU)

(72) Inventor: Patrick Muscat, Freemans Reach (AU)

(73) Assignee: The Lawn & Turf Company Pty. Ltd., Berkshire Park (AU)

( * ) Notice: Subject to any disclaimer, the term of this patent is extended or adjusted under 35 U.S.C. 154(b) by 0 days.

(21) Appl. No.: 16/324,890

(22) PCT Filed: Aug. 10, 2017

(86) PCT No.: PCT/IB2017/054881
§ 371 (c)(1),
(2) Date: Feb. 11, 2019

(87) PCT Pub. No.: WO2018/029627
PCT Pub. Date: Feb. 15, 2018

(65) Prior Publication Data
US 2019/0255539 A1    Aug. 22, 2019

(30) Foreign Application Priority Data

Aug. 10, 2016    (AU) .................................. 2016903142

(51) Int. Cl.
*B05B 1/04*        (2006.01)
*B05B 1/20*        (2006.01)
(Continued)

(52) U.S. Cl.
CPC ................ *B05B 1/04* (2013.01); *A01G 20/30* (2018.02); *A01M 7/0064* (2013.01); *B05B 1/20* (2013.01);
(Continued)

(58) Field of Classification Search
CPC ..... A01G 20/30; A01G 20/00; A01M 7/0064; E01C 23/22; E01C 23/222; B05B 1/28;
(Continued)

(56) References Cited

U.S. PATENT DOCUMENTS 2,204,099 A * 6/1940 Allgrunn ............. A01M 7/0064
239/159
3,512,714 A * 5/1970 Morton ............... A01M 7/0089
239/168
(Continued)

FOREIGN PATENT DOCUMENTS

GB        2266863 A    11/1993

OTHER PUBLICATIONS

Patent Cooperation Treaty, "International Search Report", PCT/IB2017/054881, dated Oct. 13, 2017, pp. 1-4.
(Continued)

*Primary Examiner* — Tuongminh N Pham
(74) *Attorney, Agent, or Firm* — Kunzler Bean & Adamson (57) ABSTRACT

A method for colouring turf and a turf colouring system. The method and system comprise delivering liquid colourant at a hydraulic pressure greater than 1000 psi to sprayers having a high pressure, high impact, fine spray nozzle with a spray pattern having feathered edges for even coverage with overlapping nozzles. Alternatively, the method and system comprise delivering liquid colourant at a pneumatic pressure greater than 60 psi to sprayers having a high pressure, high impact, fine spray nozzle with a spray pattern having feathered edges for even coverage with overlapping nozzles.

4 Claims, 7 Drawing Sheets

(51) Int. Cl.
  *B05B 9/04* (2006.01)
  *A01G 20/30* (2018.01)
  *B05B 13/00* (2006.01)
  *B05B 9/03* (2006.01)
  *B05B 15/18* (2018.01)
  *A01M 7/00* (2006.01)
  *A01G 2/00* (2018.01)

(52) U.S. Cl.
  CPC .............. *B05B 9/03* (2013.01); *B05B 9/0409* (2013.01); *B05B 13/00* (2013.01); *B05B 13/005* (2013.01); *B05B 15/18* (2018.02); *A01G 2/00* (2018.02)

(58) Field of Classification Search
  CPC .... B05B 1/20; B05B 1/04; B05B 9/03; B05B 9/0409; B05B 13/00; B05B 13/005
  See application file for complete search history.

(56) References Cited

U.S. PATENT DOCUMENTS

| | | | |
|---|---|---|---|
| 3,606,264 A * | 9/1971 | Clifton | A01M 7/005 366/192 |
| 3,907,202 A | 9/1975 | Binoche | |
| 4,186,879 A * | 2/1980 | Kinder | A01M 7/0064 172/248 |
| 5,312,028 A | 5/1994 | Hume | |
| 2007/0057089 A1 | 5/2007 | Schroter | |
| 2010/0127100 A1* | 5/2010 | Walmer | E01C 23/22 404/93 |
| 2012/0325924 A1 | 12/2012 | Baltus | |
| 2014/0120251 A1 | 5/2014 | Grimm et al. | |

OTHER PUBLICATIONS

Patent Cooperation Treaty, "Written Opinion of the International Searching Authority", PCT/IB2017/054881, dated Oct. 13, 2017, pp. 1-3.

* cited by examiner

METHOD AND SYSTEM FOR COLOURING TURF

FIELD OF THE INVENTION

This invention relates to a method and system for colouring turf.

The invention has particular, although not exclusive, utility for colouring turf in turf farms, where large areas of turf are grown for subsequent harvesting into discrete rolls or segments, which are then sold for laying in particular domestic or public applications. These applications may include creating lawns or grassed areas for domestic or public use, repairing and maintenance of such lawns or grassed areas, or any other applications where segments having aesthetic appeal may be desired to be used.

The invention also has utility for colouring lawn or turf in situ, such as golf courses, domestic lawns and parks, and playing fields for sport, where sizeable areas may be desired to be coloured and returned to having vibrant aesthetic appeal.

Throughout the specification, unless the context requires otherwise, the word "comprise" or variations such as "comprises" or "comprising", will be understood to imply the inclusion of a stated integer or group of integers but not the exclusion of any other integer or group of integers.

BACKGROUND

The following discussion of the background art is intended to facilitate an understanding of the present invention only. It should be appreciated that the discussion is not an acknowledgement or admission that any of the material referred to was part of the common general knowledge as at the priority date of the application.

During times when grass is dormant, such as in winter for warm season grasses, and in summer for cool season grasses, turf naturally loses its colour and tends to turn brown or pale. This can be unappealing in the case of turf farms with their ability to sell turf during the dormant season when the turf is still 'alive' but looks 'dead', or spectators and players in the case of playing fields and their aesthetic appeal, or for lawn owners generally, despite the fact that the lawn or turf is perfectly healthy.

In the case of turf farms, in order to improve the visual appeal of the lawn or turf for sale, especially during times when the grass is dormant, it is common to spray the turf in situ with a colourant, prior to harvesting.

Present methods and systems employed for colouring the turf involve a boom sprayer trailed by a tractor or other type of prime mover, which carries one or more tanks of colourant. An active tank is connected via a known colourant delivery system including delivery hoses and a pump, usually driven by the power take-off (PTO) system of the prime mover, to sprayers disposed along a transverse been of the boom sprayer. These sprayers spray colourant delivered to them under pressure from the pump over the turf, laterally along the beam, relative to the direction of travel of the prime mover.

It has been found that with using typical pump pressures and conventional spraying heads for boom sprayers, it takes approximately 16 litres of colourant concentrate mixed with water at a ratio of 4 litres of colourant to 100 litres of water to cover a hectare of turf to achieve an even spread of the colourant over the blades of grass of the turf. Due to the imperfect spread of the colourant, it typically takes 2 to 3 passes of the boom sprayer over the same area to get an even distribution of the colour over the blades of grass.

The sprayers use a tip of the wide angle flat spray type marketed under the brand Turbo TeeJet™. These tips feature a tapered edge wide angle flat spray pattern that provides a uniform coverage in broadcast spraying applications. They include a large, rounded internal passage to minimise clogging and have excellent resistance to corrosive solutions. They have superior wear characteristics and provide for larger droplets to be used for less drift operating at pressures of 15-90 psi (1-6 bar).

It has been found that with the present application, the tip known as the TT11003 nozzle operating at around 30 psi works best. This produces a course droplet size according to BCPC specifications and in accordance with ASABE Standard S572.1. One of these types of nozzle has a capacity of 0.26 gallons per minute or 33 ounces per minute at a pressure of 30 psi, which can deliver an optimum spray pattern of 110° with a spray pattern width of 140 cm at preferably 50 cm distance from the nozzle. The pump used for this purpose is a hydraulic pump having a maximum pressure of 100 psi.

Despite the benefits of using a boom sprayer, given the volume of colourant used and the time taken to perform repeat runs of the same area of turf, colouring of turf prior to harvesting has been found to be a rather arduous undertaking, but still is considered commercially necessary in order to enable and optimise the sale of turf during dormant growth periods of the year.

With respect to playing fields, given the commercial gains that arise from playing professional sport in stadiums, no expense is spared in constantly replacing large sections of turf with new turf transported in from long distances where it has previously been grown in a location where abundant sunlight is still available.

In locations where sport is played indoors due to there being snow-covered areas outside in the middle of winter, extreme measures such as using artificial light and heating coils are used to grow otherwise dormant turf within a completely closed stadium during non-playing periods. Lambeau Field in the US state of Wisconsin where the Packers play grid-iron is a case in point, where racks of 1000 W bulbs are wheeled out to provide artificial light for the turf to grow.

Clearly this places a massive drain on energy use, however, when the NBL in the USA is quoted to be making around $US10 billion a year, the expense can be justified.

Consequently, with playing fields, colouring turf is usually limited to line marking, where specialised machinery involving single spray heads having a bounded field of spray to provide accurate lines is used, which involves alternate concepts than those associated with spraying larger areas of turf in a single pass.

DISCLOSURE OF THE INVENTION

As a consequence of trial and error in adjusting various parameters and components of a boom sprayer, a remarkable improvement was discovered in reducing considerably the volume of colourant required to spray an area of turf to achieve a satisfying hue for sale, and furthermore, remarkably improving the colour retention period of the turf.

Consequently, it is an object of the present invention to reduce the volume of colourant required for spraying an area of turf in order to achieve an aesthetically appealing hue and providing a machine and methodology capable of achieving this effect.

In accordance with one aspect of the present invention, there is provided a method for colouring turf, comprising: delivering liquid colourant at a pressure greater than 1000 psi to a sprayer having a high pressure, high impact, fine spray nozzle with a spray pattern for even coverage when disposed in a plane in substantially horizontal relationship, a prescribed distance above the ground.

In accordance with another aspect of the present invention, there is provided a method for colouring turf, comprising: delivering liquid colourant at a pneumatic pressure greater than 60 psi to sprayers having a high pressure, high impact, fine spray nozzle with a spray pattern for even coverage when disposed in a plane in substantially horizontal relationship, a prescribed distance above the ground.

Preferably, the method in either of the aforementioned aspects includes encapsulating the spray pattern of the sprayer so as to create a positive pressure chamber above the ground, when the sprayer is disposed in the plane at said spaced horizontal relationship to the ground.

Preferably, the method includes creating a substantially continuous sealing of the pressure chamber with the ground as the sprayer advances in a substantially coplanar direction relative to the ground, when the plane is at the prescribed distance.

Preferably, the method includes a plurality of sprayers, where the nozzles are disposed so that the spray pattern overlaps between adjacent nozzles.

In accordance with another aspect of the invention, there is provided a turf colouring system for colouring an area of turf comprising:
  a hydraulic pressurising means for delivering liquid colourant at a hydraulic pressure greater than 1000 psi along a delivery hose; and
  a sprayer having a high pressure, high impact, fine spray nozzle with a spray pattern for receiving liquid colourant via the delivery hose is;
  wherein the sprayer is disposed in a plane in substantially horizontal relationship, a prescribed distance above the ground, so as to provide for even coverage of the turf bounded within the lateral extent of the sprayer pattern.

Preferably, the beam has a shroud fixedly disposed relative to the beam to circumscribe the sprayer and create a positive pressure chamber encapsulating the spray pattern from the nozzle above the ground when the sprayer is disposed in the plane at said spaced horizontal relationship to the ground.

Preferably, the shroud has a flexible curtain that depends so as to engage and create a substantially continuous sealing of the pressure chamber with the ground as the sprayer advances in a substantially coplanar direction relative to the ground, when the plane is at the prescribed distance.

Preferably, the system includes a plurality of sprayers wherein the sprayers are disposed laterally along a beam transverse to their direction of travel so that the nozzles are a prescribed distance apart and the spray pattern overlaps between adjacent nozzles when the plane is at the prescribed distance.

BRIEF DESCRIPTION OF THE DRAWINGS

The invention will be better understood having regard to a best mode for carrying out the invention, which is subsequently described with reference to the following drawings, wherein:

FIG. 4 are perspective views of the nozzle; wherein.

BEST MODE(S) FOR CARRYING OUT THE INVENTION

Figure 1:
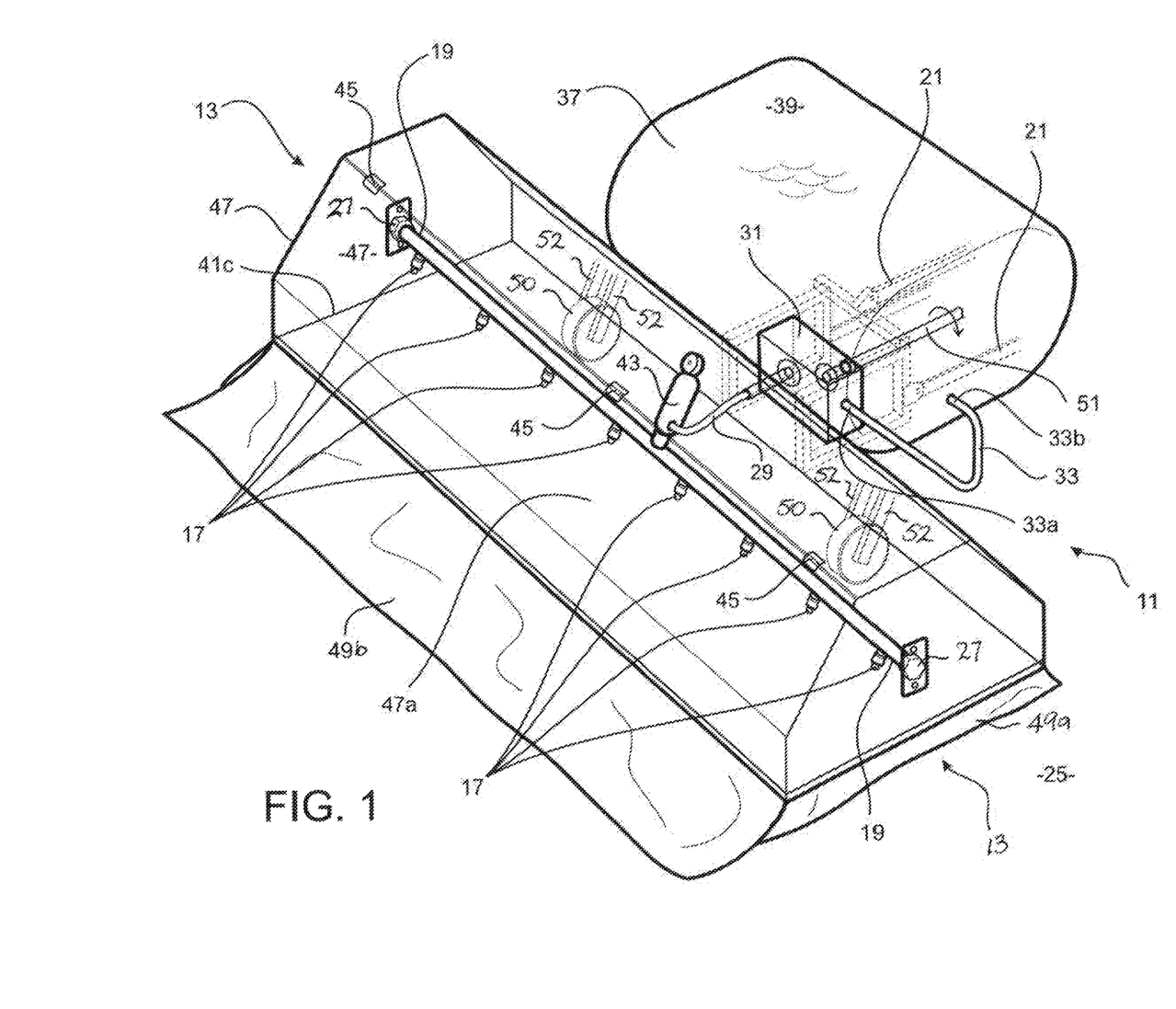
FIG. 1 is a schematic perspective view of the beam and shroud of the turf colouring system showing the arrangement of the sprayers in accordance with the specific embodiment of the best mode.
Figure 2:
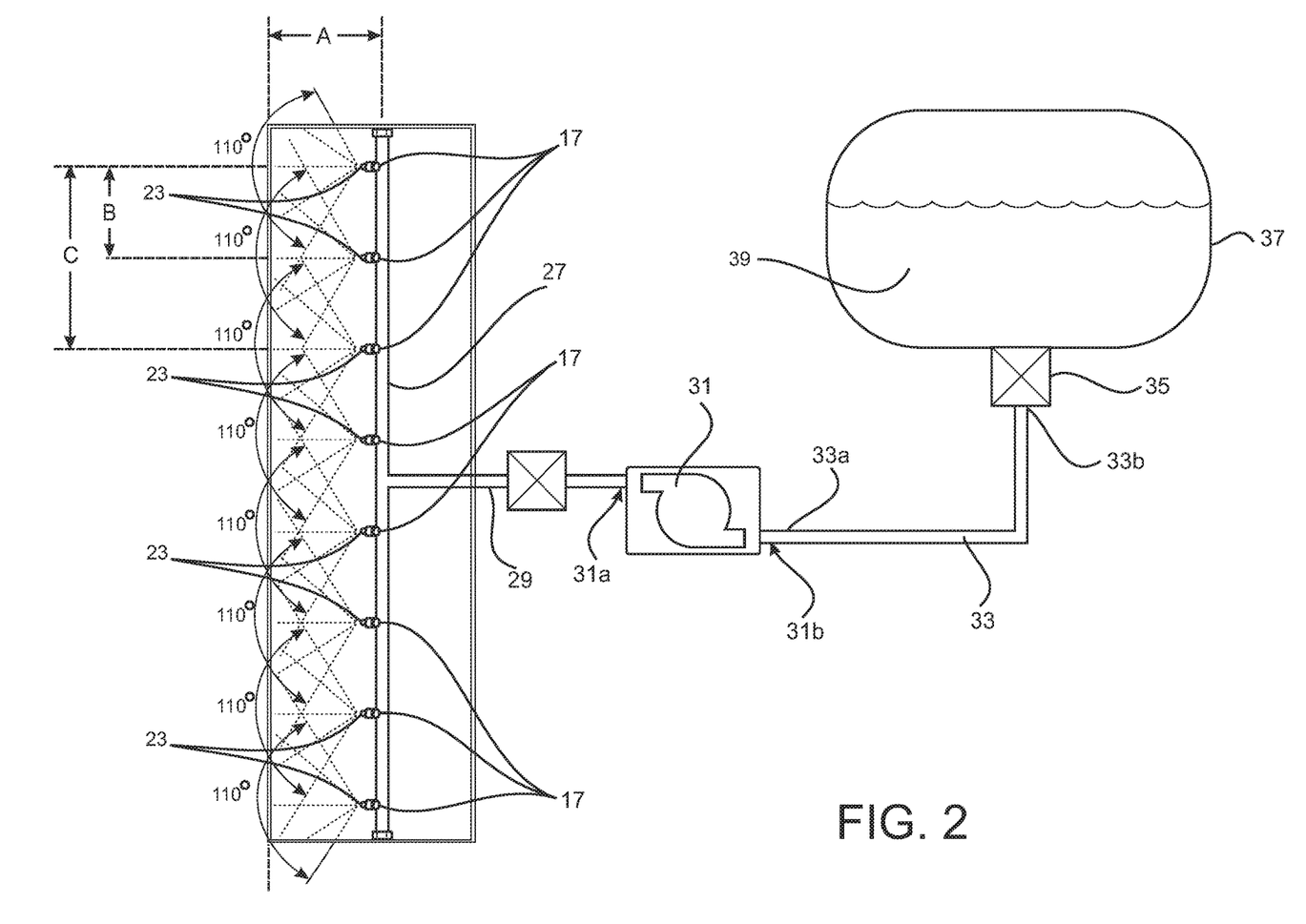
FIG. 2 is a schematic circuit diagram showing the main components of the turf colouring system connecting to the boom sprayer of FIG. 1, where a rear elevation view of the boom sprayer relative to the ground showing the overlapping arrangement of the fan spread of the spray of each nozzle.
Figure 3A:
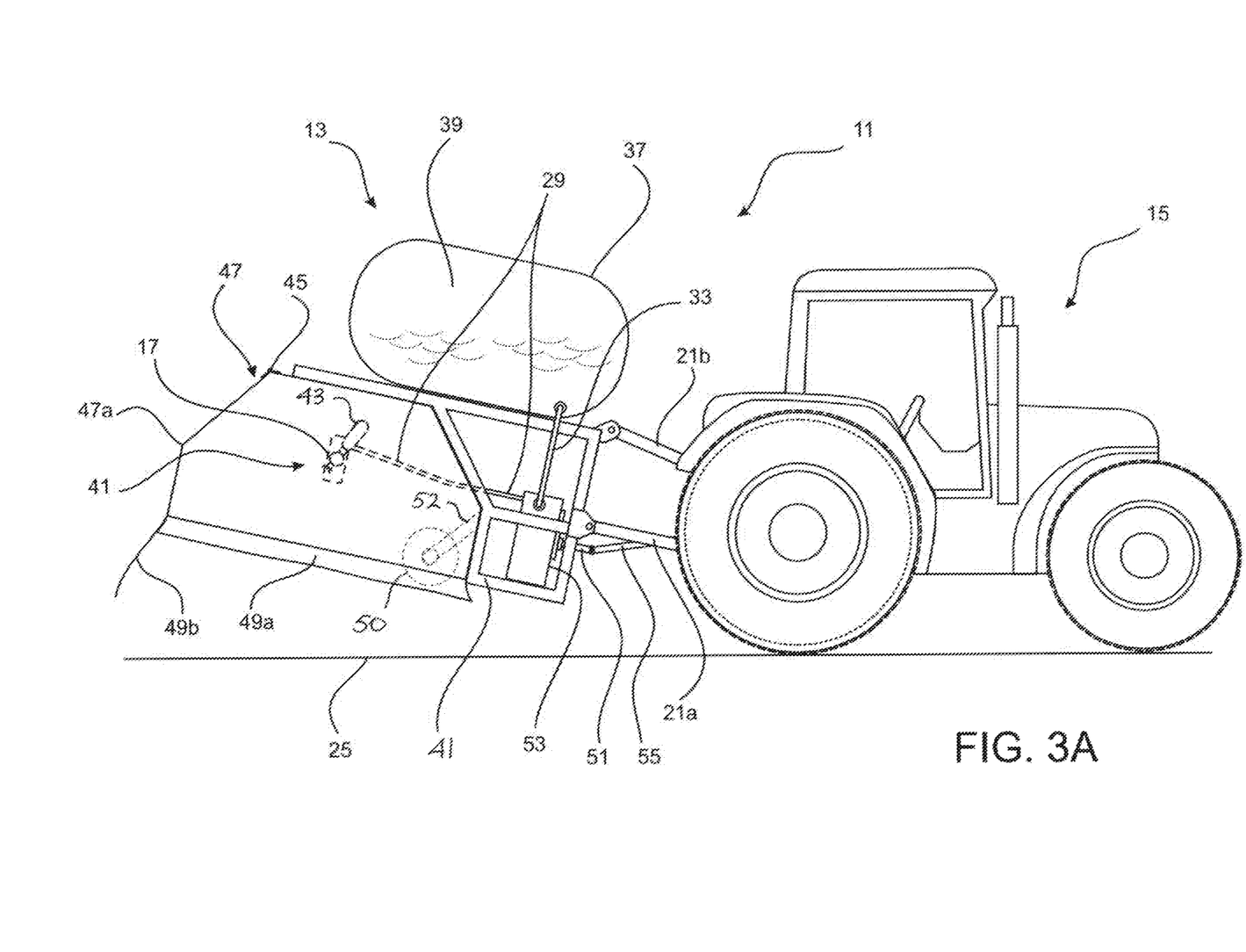
FIG. 3A is a schematic side view showing the turf colouring system connected to a prime mover with the beam raised so that the plane is disposed at an elevated position relative to the prescribed distance.
Figure 3B:
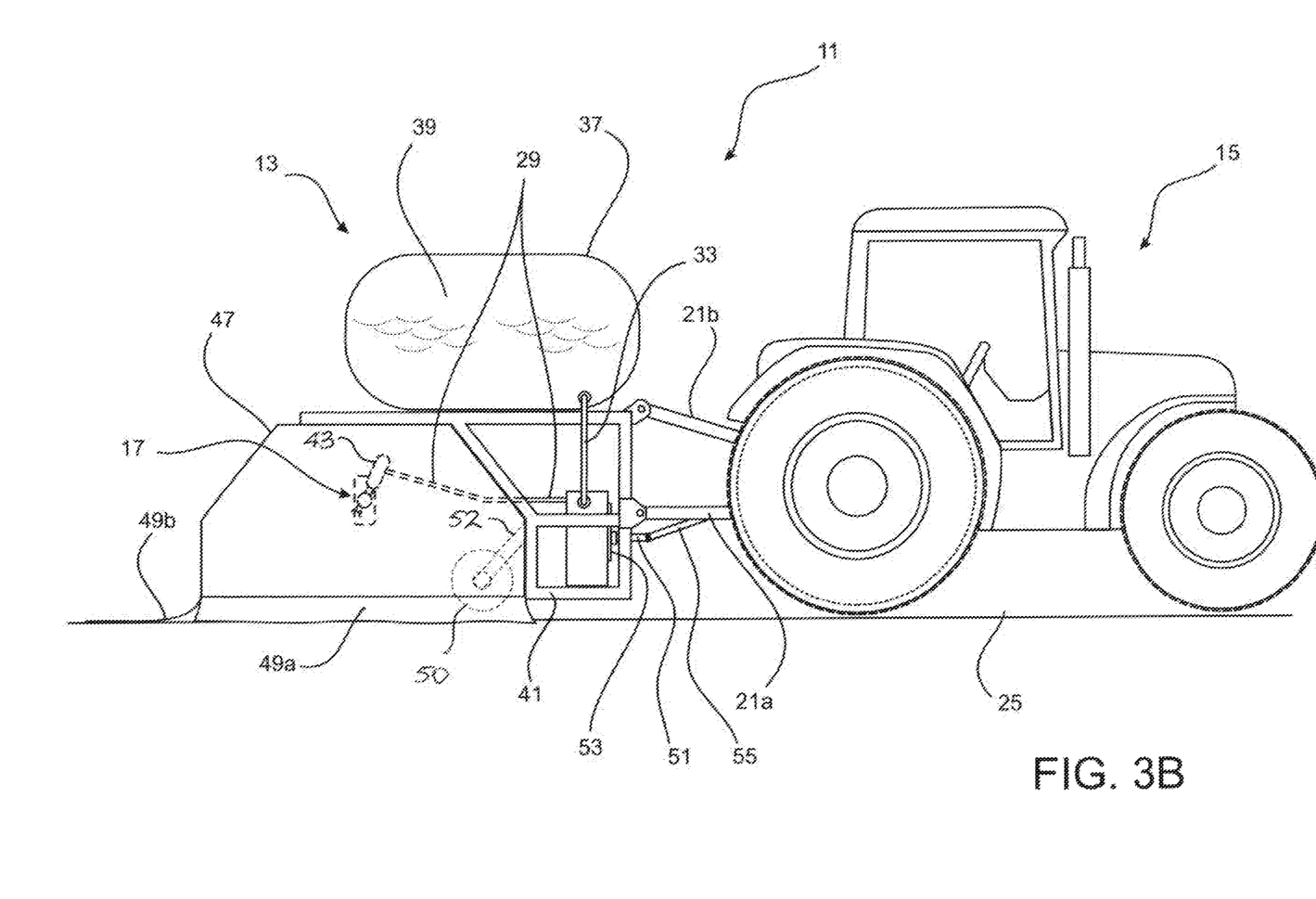
FIG. 3B is a similar view as to FIG. 3A, but showing the beam lowered so that the plane is to store closed at the prescribed distance.

The best mode for carrying out the invention is directed towards a colouring method and system for turf in a turf farm environment prior to harvesting, as shown in FIGS. 1 to 3.

The turf colouring system 11 uses a boom sprayer 13 attached to a prime mover in the form of a tractor 15. The boom sprayer 13 has a series of sprayers 17 fixed laterally a prescribed distance apart along a transversely extending manifold 19 to the direction of travel, which forms part of the boom sprayer. Each sprayer 17 has a high pressure, high impact, fine spray nozzle 23.

The boom sprayer 13 is attached to an angularly adjustable hoist 21, pivotally mounted to the rear of the tractor 15. The hoist 21 comprises a pair of lower arms 21a and an upper arm 21b, which are connected to a tractor-based hydraulic system (not shown), powered by a hydraulic pump and having one or more hydraulic rams to selectively raise, lower and/or the tilt hoist 21 and consequently the boom sprayer 13 connected thereto, relative to the ground 25. The tilting is achieved by extending or retracting the ram connected to the upper arm 21b relative to the lower arms 21a.

The sprayers 17 are directly and detachably connected in series to the manifold 19, which is respectively coupled at its opposing ends by nuts 27 to threaded end closures (not shown) fixedly disposed at opposite ends of a cowling 47. The manifold 19 in turn is fed centrally by a disposed delivery hose 29 via a high-pressure filter 43 of 200 mesh, where the delivery hose is connected to an outlet 31a of a hydraulic pressurising means in the form of a colourant discharge pump 31. The colourant discharge pump 31 has an inlet 31b, which is in turn connected to an outlet end 33a of a main colourant discharge hose 33, the colourant discharge hose 33 has an inlet 33b connected to an outlet valve 35 disposed at the base of an ambient pressure, storage tank 37 for containing liquid colourant 39.

The cowling 47 is detachably mounted to the hoist 21 by way of a sub-frame assembly 41. The cowling 47 forms a hood to circumscribe the sprayers 17 and provide fixture points at opposite ends for the end closures to fix the manifold 19. The cowling 47 is also fitted with a flexible skirt 49 depending from its lower periphery. The skirt 49 is provided with anterior and side portions 49a that can be disposed by lowering the boom sprayer 13 by way of controlling the hoist to terminate distally, marginally above, or just touching, the ground 25 when in the operating position. The skirt 49 is also provided with a trailing posterior portion 49b of marginally longer extent than the interior and side portions 49a, so that in the operating position the distal end thereof glides over the surface of the turf to facilitate permeation of the mist generated by the sprayers 17 within the confines of the cowling 47, through the blades of grass.

Also provided within the cowling 47 are a pair of idler wheels 50 fixedly attached to the subframe assembly via positioning arms 52. The positioning arms 52 each support an axle about which a corresponding idler wheel 50 rotates, and depend from the subframe to enable the wheels to engage the ground at a marginal distance beyond the extent of the rigid portion of the cowling, proximate to the distal end of the anterior skirt portion 49a to ensure elevation of the rigid anterior extent of the cowling over any bumps encountered while traversing along the ground surface. This protects the rigid structural portion of the cowling 47 from engaging the ground 25 and causing damage to it.

The rear of the cowling 47*a* is separately formed so that it is hingedly attached along the top of the cowling via a series of hinges 45 to form a closure that may be detachably locked in a depending position to close the cowling during operation, or be opened to allow access to the interior of the cowling for maintenance purposes.

The colourant discharge pump 31 in the present embodiment is a power take off (PTO) hydraulic pump constructed of brass and stainless steel with a maximum pressure rating of 4350 psi, a rated working pressure of 3600 psi, a rated flow rate of 14 L/minute, a rated engine rating of 9 hp-18 hp, and a maximum working temperature of 60° C./140° F. Accordingly, the pump 31 connects to a shaft 51, which is suitably geared via a pulley arrangement 53 and driven by the PTO system 55 of the tractor 15, to drive the pump at the required RPM and torque.

The nozzles 23 in the present embodiment are specifically designed for high-pressure spraying and each comprise a stainless steel male tubular body 23*a* that receives a stainless steel screen strainer or filter 23*b* of 200 mesh and a tungsten carbide spray tip 23*c* having an orifice size of 0.16 mm, which are secured by a tip retainer 23*d* within the body 23*a*. The tungsten carbide spray tip 23*c* provides vastly superior erosion resistance compared to standard metal and stainless steel tips, with the orifice specially designed to provide a high impact flat fan spray pattern with feathered edges for even coverage when the sprays overlap. The fan spread of the spray is 110°, which allows the nozzles to be evenly spaced apart to provide overlapping spray when the boom sprayer 19 is disposed in the operating position, at which the sprayers 17 are disposed a distance A above the ground 25.

It has been determined that optimum spraying can be achieved with the distance A is anywhere from 250 to 400 mm and the distance apart B of the sprayers 17 can be from 150 to 600 mm apart, providing for a fan spread diameter C of spray which is twice the distance B to achieve an even coverage of the ground surface.

In operation, the tank 37 is filled with liquid colourant 39 comprising a mix of colourant concentrate and water at a ratio of 1 litre of concentrate to 100 litres of water, the outlet valve 35 is turned on, the pump 31 is set to operate with an outlet pressure of greater than 1000 psi and optimally of 4000 psi, and the hoist 21 is lowered to the operating position. The PTO system 55 can then be activated from the cabin of the tractor 15 to drive the pump 31 and the tractor driven in a direction across an area of turf at a speed of approximately 7 km/h.

The cowling 47 effectively creates a positive pressure chamber within its confines, encapsulating the spray pattern from the nozzles 23 above the ground, and facilitates thorough penetration of the grass and permeation of the blades of grass with colourant being delivered to the surface of the ground under high pressure.

Furthermore, as the liquid is atomised or vaporised, the liquid covers more of the individual blades of the grass giving the unexpected result of their being less concentrate used per water volume and simultaneously providing a more even and better colour density over the section of turf being sprayed than was achieved using the prior art methods.

In this manner, the turf colouring system 11 provides a method for colouring the turf on the ground 25, which comprises delivering liquid colourant to the sprayers 17 at a pressure greater than 1000 psi, and ideally up to 4000 psi or more, given the ability of the high-pressure nozzles 23 to provide optimum erosion resistance at such high pressure.

A problem, however, with operating at such high pressure and with such small orifices is blockage. Therefore, a feature of the present embodiment is to include a dual fine-mesh filter system, whereby an initial high-pressure filter 43 is provided in the line prior to the colourant entering the manifold at high-pressure, and also individual nozzle filters 23*c* within each of the nozzles.

In an alternative embodiment, instead of the boom sprayer 13 being attached to a hoist 21 of the tractor 15, it is formed as a trailer having its own wheels, which can be trailed behind a prime mover.

In a further embodiment, instead of adopting an ambient pressure tank, a hydraulic pump that is driven by the PTO of the prime mover and high-pressure, high impact nozzles of the type described in respect of the first embodiment, the boom sprayer 13 includes a pressurised tank and a pneumatic pressurising means in the form of a pneumatic pump for pressurising liquid colourant within the tank at a pressure of approximately 80 psi. The main colourant discharge hose 33 can then be directly connected to the tubular manifold 27, and the sprayers fitted with lower pressure atomiser nozzles, which provide a similar overlapping spray pattern, but with the liquid being delivered at a lower pressure.

In this embodiment, however, the pneumatic pressure facilitates building a sufficient positive pressure chamber within the shroud 47 and the unitary framework of the boom sprayer 13 to enable permeation of the blades of grass with colourant to a similar degree that can be achieved in the first embodiment.

In all embodiments, an extraordinary reduction in the volume of liquid colourant required to be used to colour the turf per hectare is achieved compared to prior art systems, in the order of ¼ to ⅕ of these prior art systems. Moreover, it was usual to use in the order of 16 litres of colourant concentrate per hectare of the prior art system, whereas with the invention the amount of colourant concentrate used is in the order of 4 litres per hectare This represents an extraordinary saving in the amount of liquid colourant required to coat a given area of turf, and also a far superior permeation of the grass blades, whilst maintaining the longevity of the colour for several weeks.

Essentially, a cost of 0.025 cents per square metre in colourant concentrate use is achievable using either of the aforementioned embodiments, whereas the old system involved a cost of approximately 0.16 to 0.25 cents per square metre.

Figure 4A:
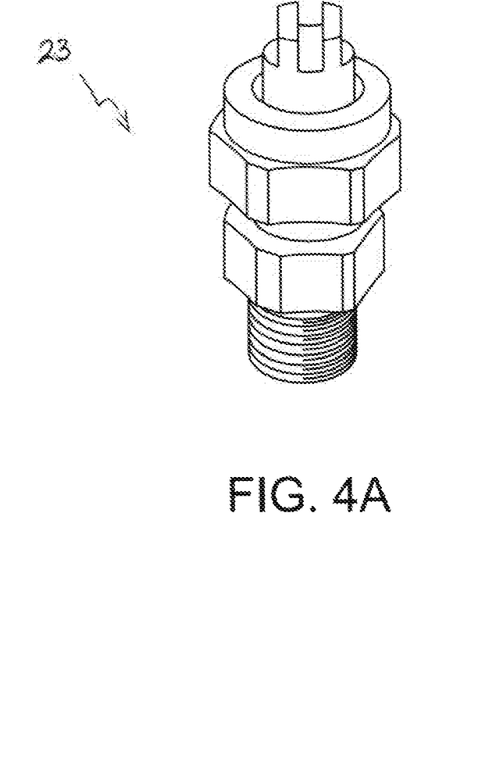
FIG. 4A is of a complete nozzle.
Figure 4B:
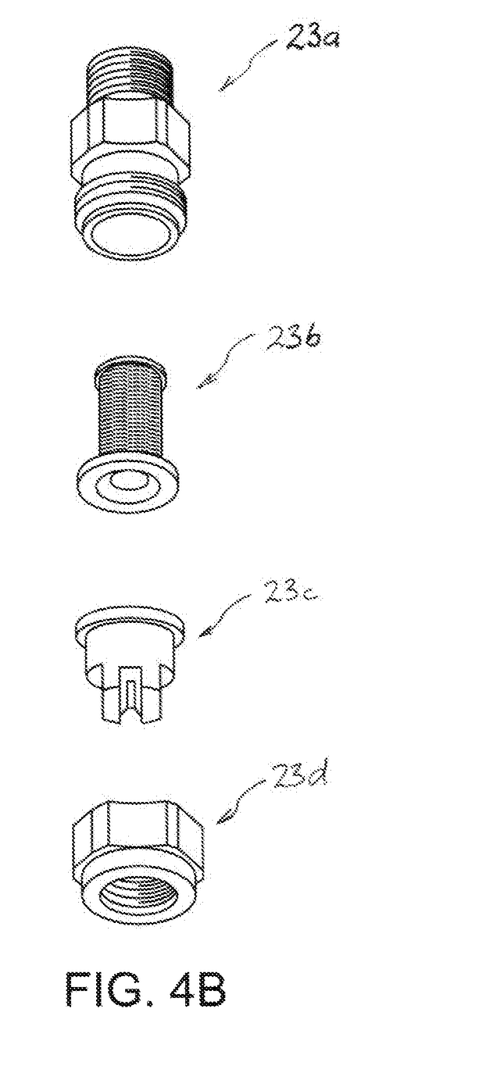
FIG. 4B is an exploded view of a nozzle.
Figure 5:
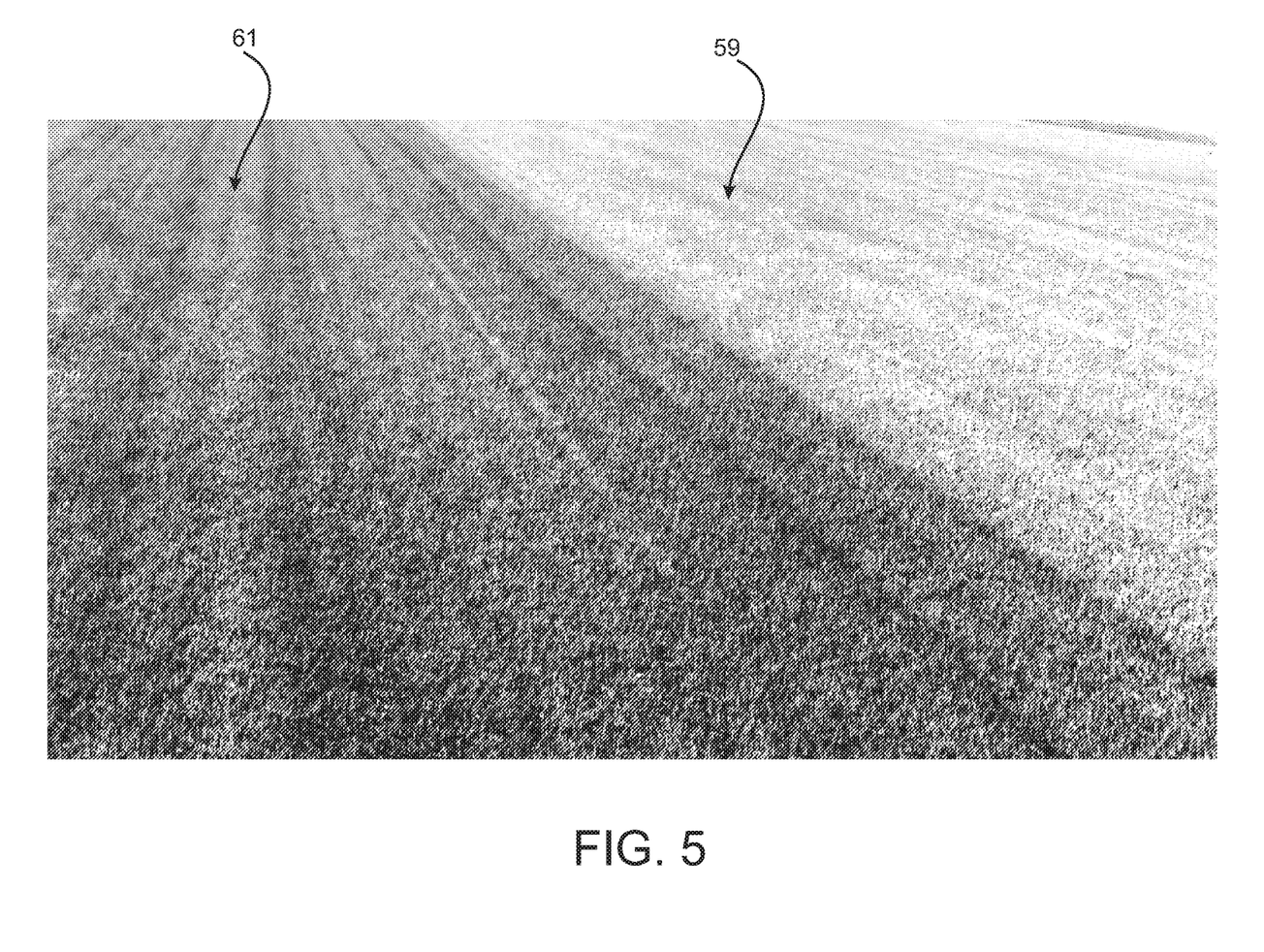
FIG. 5 is a perspective view of a paddock showing the contrast between a sprayed area of turf using the turf colouring method and system and adjacent turf prior to spraying.

The improvements achieved can be seen in FIG. 4, where the section 59 of the paddock is yet to be sprayed and the section 61 of the paddock has just recently been sprayed.

Figure 6A:
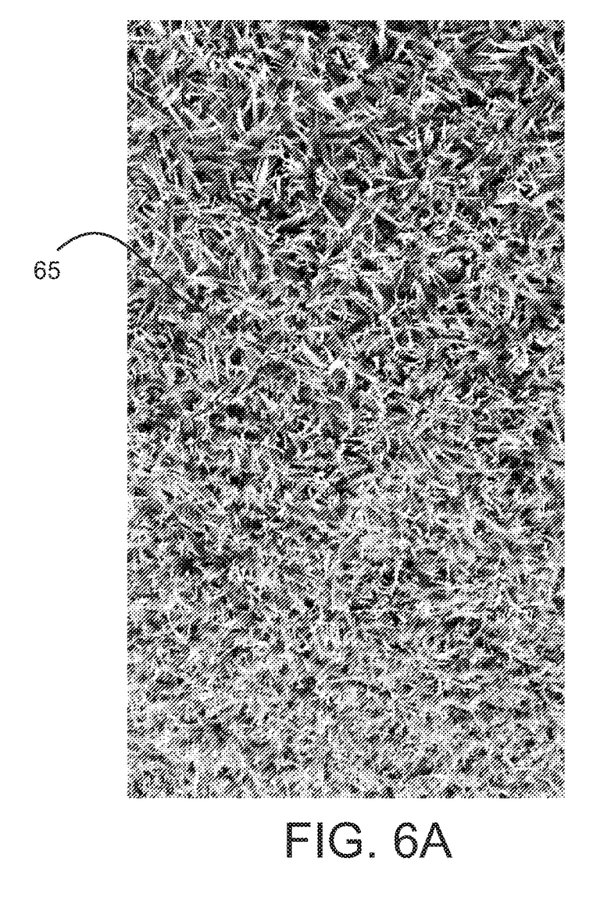
FIG. 6A is a close up view of an area of turf, a few days after being sprayed using the prior art method and system, showing the discolouration of the turf.
Figure 6B:
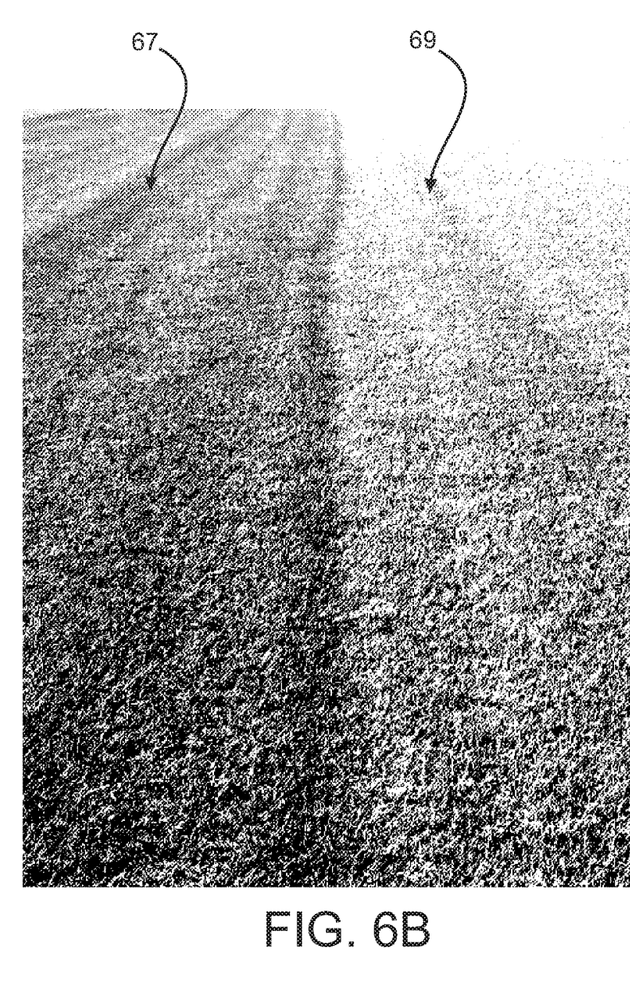
FIG. 6B is a similar view to FIG. 6A but showing an adjacent area of turf sprayed using the turf colouring method and system of the present invention after the same period of time.

Having regard to prior art methods, in FIG. 6A the section 65 of turf shown was sprayed three days ago using the standard prior art method where liquid colourant is delivered at a pressure of 50 psi using a hydraulic pump. By way of contrast, in FIG. 6B the section 67 of turf shown was sprayed with a single pass using the method of the first embodiment where liquid colourant is delivered to pressure of 4000 psi using a hydraulic pump and the adjacent section 69 of turf was sprayed with a single pass using the standard prior art method.

Upon close inspection of the turf shown in FIG. 6A, the liquid tends to lie on the surface of the blades of grass in globule form, rather than be evenly permeate it. Thus globules of liquid tend to conglomerate, not covering the surface area of the blades of grass and using greater volume of liquid. It would seem that the higher pressure atomiser atomises the liquid into very fine particles or vaporises the liquid into more of a gaseous state allowing it to more thoroughly penetrate the grass and thus more evenly permeate and coat the surface area of the blades of grass, using a lesser volume of liquid for the same area.

A significant feature of the embodiments appears to be the need to encapsulate and seal the atmosphere impinging the turf surface being sprayed, compared to the ambient atmosphere, in order to maintain a high pressure environment for the atomised or vaporised coloured liquid exiting the nozzles to evenly permeate and coat the surface of the blades of turf.

It should be appreciated that the scope of the present invention is not limited to the specific mode and embodiments of the invention described above. Other modes and embodiments of the invention may be envisaged that are not the same as the described mode, but do not depart from the spirit nor scope of the invention as defined by the claims.

The invention claimed is:

1. A turf colouring system for colouring an area of turf comprising:

pressurising means for delivering liquid colourant along a delivery hose;

a plurality of laterally spaced sprayers for receiving liquid colourant via the delivery hose, the sprayers each having a high pressure nozzle to produce one of an atomized or a vaporized mist of colourant in spray patterns that overlap between adjacent sprayers of the plurality of laterally spaced sprayers, where each of the plurality of laterally spaced sprayers are disposed in a plane in a substantially horizontal relationship a prescribed distance above the ground; and a shroud enclosing the nozzles to create a positive pressure chamber for the spray patterns in use, where the shroud comprises:

a rigid first portion; and a flexible second portion extending from the first portion towards and engaging with a surface of the ground so that the nozzles are circumscribed by the first portion and the second portion to form a substantially continuous sealing with the ground.

2. A turf colouring system as claimed in claim 1, wherein the flexible second portion has anterior and side portions that terminate above or just touching the ground when the nozzles are at said prescribed distance from the ground.

3. A turf colouring system as claimed in claim 1 wherein the flexible second portion has:

anterior and side portions that terminate above or just touching the ground when the nozzles are at said prescribed distance from the ground; and a posterior trailing portion that is longer than the anterior and side portions whereby an end of the posterior trailing portion glides over the turf as the sprayers are disposed laterally with the nozzles at said prescribed distance from the ground.

4. A turf colouring system as claimed in claim 1, wherein the pressurizing means is a hydraulic pressurizing means for providing said delivery to said sprayers at a hydraulic pressure greater than 1000 psi.

* * * * *